United States Patent Office 3,402,796
Patented Sept. 24, 1968

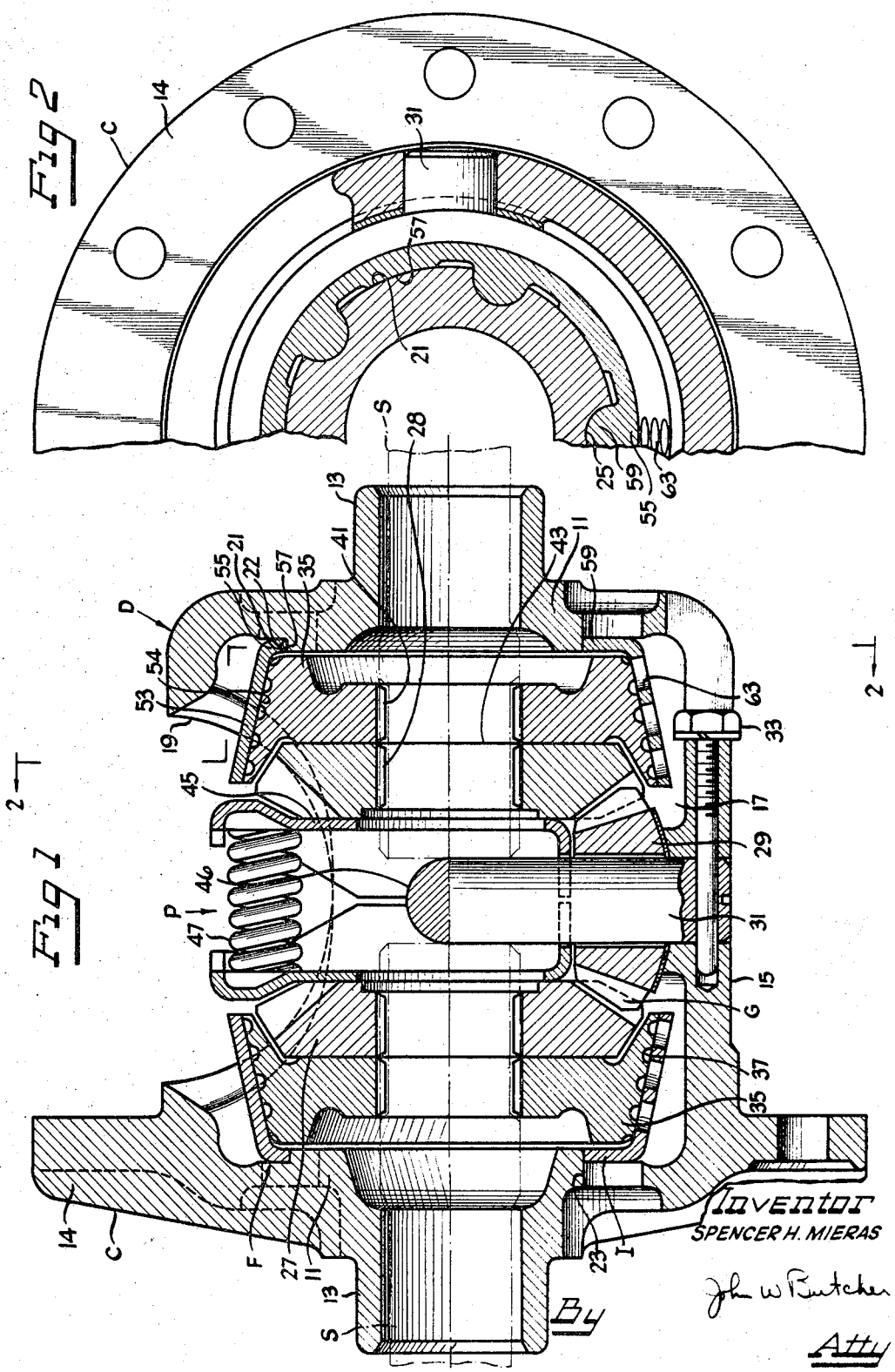

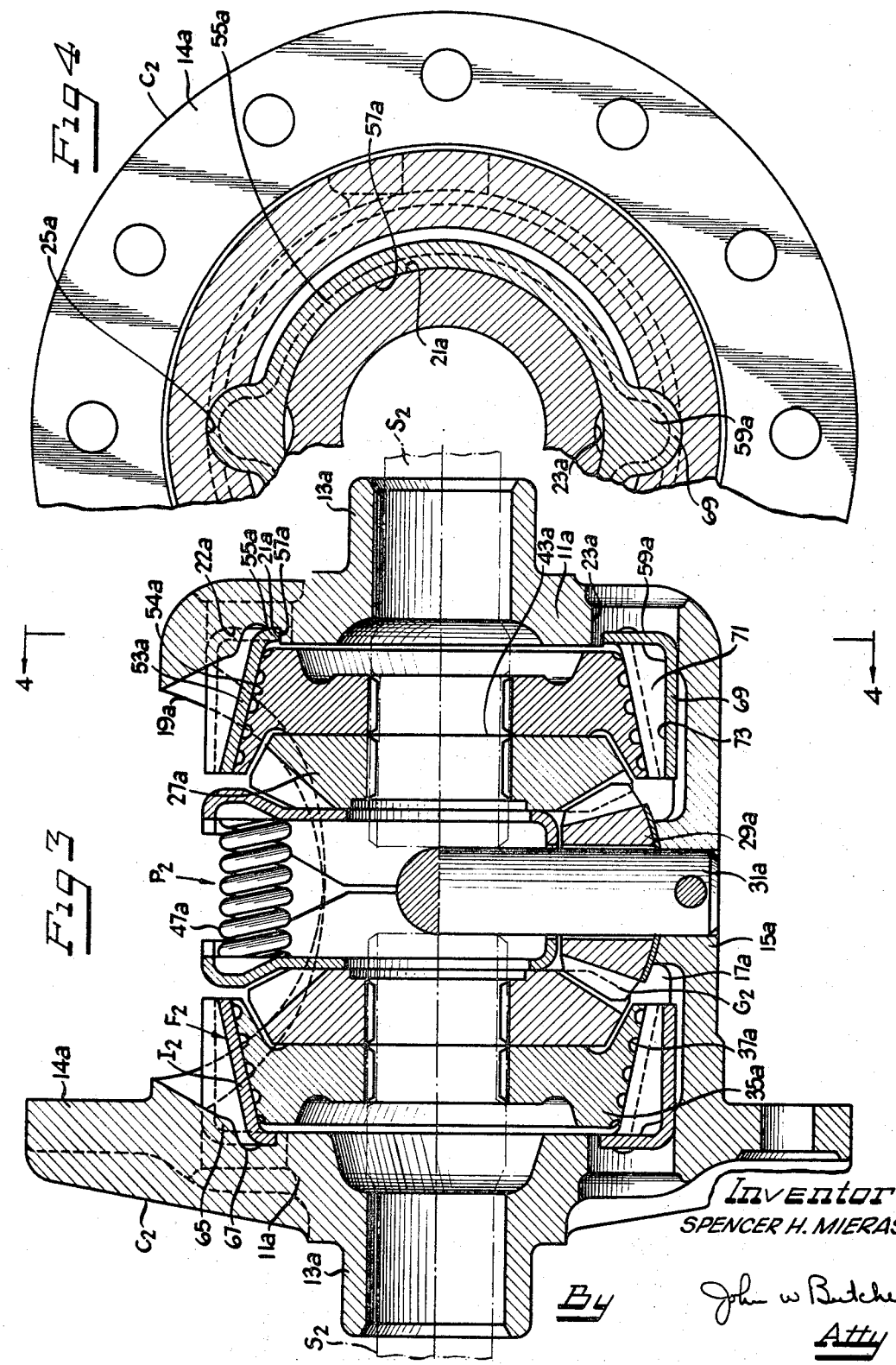

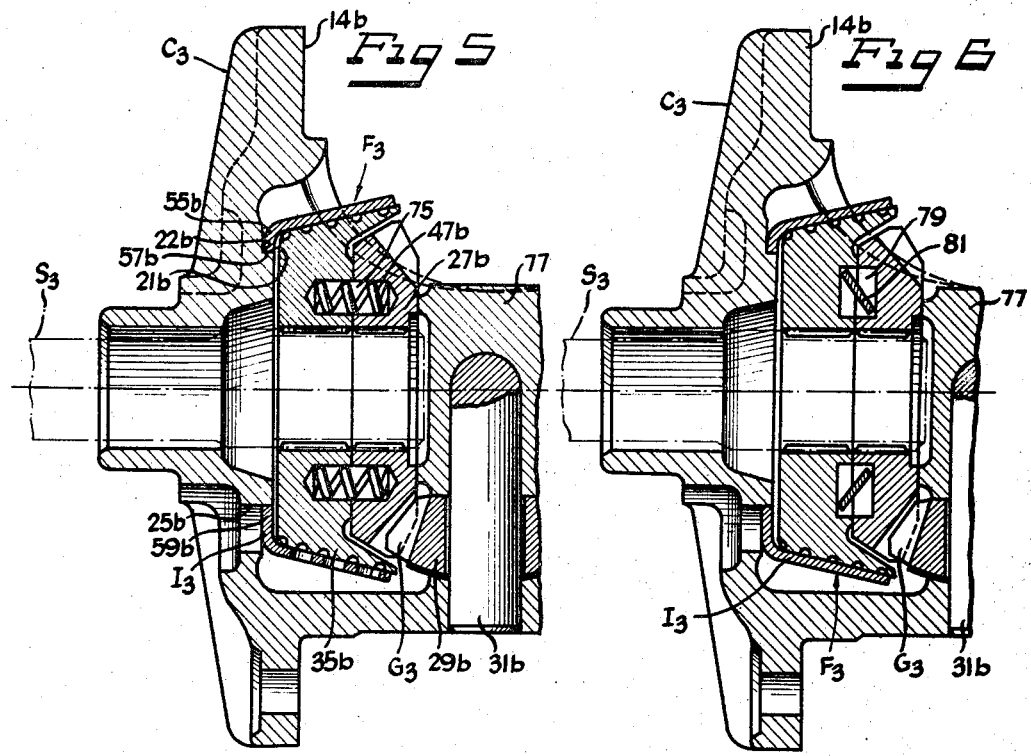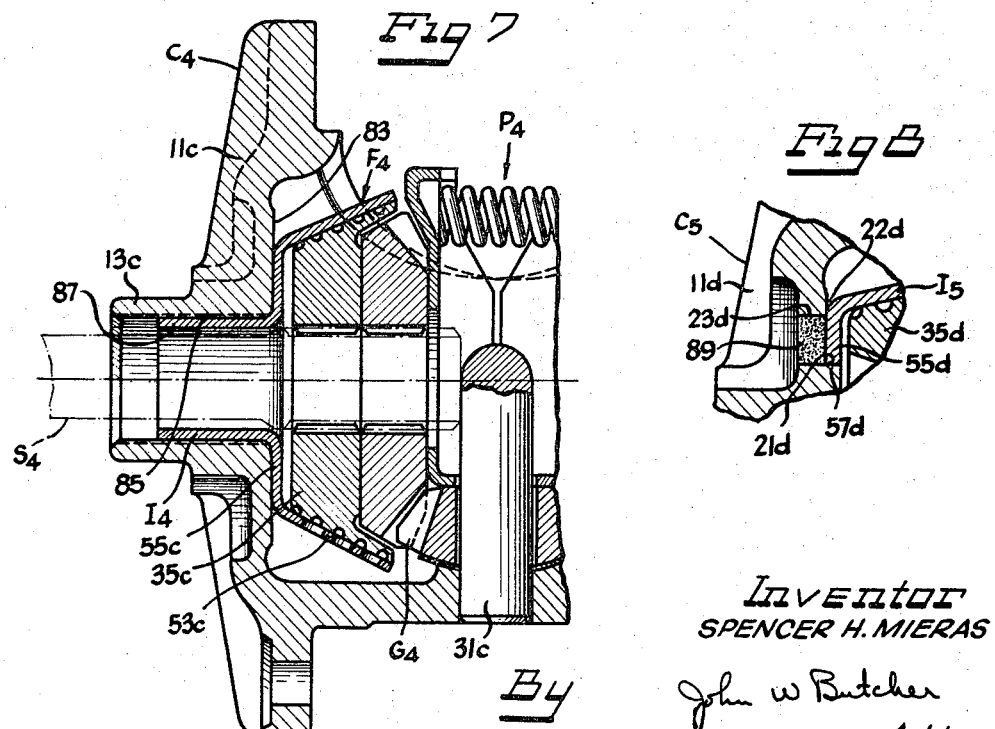

3,402,796
DIFFERENTIAL MECHANISM
Spencer H. Mieras, Ft. Wayne, Ind., assignor to Borg-Warner Corporation, a corporation of Illinois
Original application July 29, 1965, Ser. No. 475,808, now Patent No. 3,327,557, dated June 27, 1967. Divided and this application May 10, 1967, Ser. No. 655,690
7 Claims. (Cl. 192—107)

ABSTRACT OF THE DISCLOSURE

An insert for a limited slip differential mechanism defining a conical clutch member seating surface. The insert includes means for a radial and axial positioning within the insert as well as for providing driving engagement between the insert and the mechanism casing.

---

The present invention is a divisional application of Ser. No. 475,808, filed July 29, 1565, now Patent No. 3,327,-557 granted June 27, 1967, entitled Differential Mechanism.

This invention relates to limited slip differential mechanisms which provide a predetermined resistance to differential action, More particularly, it relates to limited slip differential mechanisms which utilize conically shaped clutch members to provide the resistance to free differentiation and to a method of assembling such a device.

Limited slip differential mechanisms generally include at least one clutch, operatively associated with the differential case and one of the output shafts to provide a predetermined resistance to differential action. Certain of these clutches include conically shaped members which engage complementary conical clutch drum or seat surfaces formed on the interior of the differential casing to provide a direct driving connection between the casing and the output shafts. Generally, two such clutches are provided, one for each output shaft; although only one clutch member associated with one output shaft could, in most instances, effectively be used.

The clutch cone seat surfaces are usually integrally formed on the interior of the differential casing by any one or a combination of various machining operations such as, for example, turning, grinding, or the like. To simplify the manufacturing processes necessary to provide these conical seat surfaces internally of the casing the casing is generally formed of two sections which are machined separately and then bolted together or otherwise fastened (as by welding). As can be appreciated, therefore, critical manufacturing tolerances are dictated by this arrangement and complex machining and inspection procedures are necessary to insure proper alignment of the seat surfaces with respect to each other and with respect to the various other critically positioned components of the structure.

Since the cone seat surfaces are integrally formed on the casing, metallurgical tolerances must be carefully controlled to provide the required physical properties for the seat surfaces.

Also, normal wear of the seat surfaces through extended use or the presence of foreign matter within the mechanism often results in deterioration of the seat surface requiring replacement of the entire differential casing to restore original operating characteristics to the clutches.

Accordingly, it is the principal object of the present invention to provide an improved form of limited slip differential mechanism utilizing a conically shaped clutch to resist differentiation.

It is another object of the present invention to provide an improved method of assembling a differential mechanism utilizing conically-shaped clutches to resist differential action.

It is a further object of the present invention to provide an improved form of limited slip differential mechanism utilizing conically shaped clutches to resist differentiation wherein the machining of conically shaped cone seat surfaces on the interior of the mechanism casing is eliminated.

It is still a further object of the present invention to provide an improved form of limited slip differential mechanism of the type described wherein the necessity of replacing the differential casing because of wear or damage to the cone seats is eliminated.

It is another object of the present invention to provide an improved form of limited slip differential mechanism of the type described which includes separate removable inserts which form the conically shaped cone seat surfaces.

It is a related object of the present invention to provide an improved form of a differential mechanism of the type described wherein separate inserts are utilized to provide the cone seat surfaces, which inserts may be readily replaced upon wear or damage to the original cone seat surfaces.

It is another object of the present invention to provide a removable cone seat insert for a limited slip differential mechanism.

These and other objects of the present invention will become apparent with reference to the following description and the accompanying drawings.

In the drawings:

FIGURE 1 is a revolved cross-sectional view of a differential mechanism constructed in accordance with the present invention showing various of the features thereof;

FIGURE 2 is a fragmentary sectional view of the apparatus of FIGURE 1 taken substantially along the line 2—2 of FIGURE 1;

FIGURE 3 is a revolved cross-sectional view of a differential mechanism constructed in accordance with the present invention showing an alternate arrangement for providing a driving relation between the cone seat inserts and the differential case, and an alternate arrangement for providing lubrication for the frictionally engaged surfaces of the clutches;

FIGURE 4 is a fragmentary cross-sectional view of the apparatus of FIGURE 3 substantially taken along the line 4—4 of that figure;

FIGURE 5 is a fragmentary, revolved sectional view of a differential mechanism incorporating various of the features of the present invention showing an alternate arrangement for providing an initial preload upon the clutch members;

FIGURE 6 is a fragmentary, revolved sectional view of a differential mechanism substantially similar to the mechanism of FIGURE 5 showing an alternate form of biasing means to provide the initial preload;

FIGURE 7 is a fragmentary, revolved sectional view of a differential mechanism constructed in accordance with the present invention showng an alternate arrangement for radially supporting the insert within the mechanism and for providing a driving relationship between the insert and the differential case;

FIGURE 8 is a fragmentary sectional view of a differential mechanism utilizing cone seat inserts showing an alternate method of providing a driving relationship between the differential case and the cone seat insert.

Referring now to the drawings, and particularly to the embodiment of FIGURES 1 and 2, there is shown a differential mechanism generally designated D disposed in operative association with a pair of coaxially aligned relatively rotatable output shafts S. These shafts may form the driving axle of an automotive or commercial vehicle, farm tractor, or any other device which requires distribution of torque to two utilization points where relative movement between shafts occurs under certain operating conditions.

Very generally, the mechanism D includes a casing C surrounding adjacent ends of the output shafts S which casing is adapted to receive input torque from a drive line system (not shown). A bevel gear system generally designated G is connected between the casing C and the shafts S and transmits rotational effort to the shafts while simultaneously allowing relative rotation between them when required, as when an automotive vehicle negotiates a corner or curve.

A pair of friction clutches F provide the desired resistance to differential action. Each clutch includes a friction surface associated with the casing C and a friction surface associated with one of the output shafts S. Frictional engagement of these surfaces provides a direct path for transmission of rotational effort from the casing to the output shafts independent the bevel gear system G. The clutches thus overcome the inherent ability of the mechanism to allow differentiation between shafts and torque is transmitted to both shafts even though they may experience unequal loading.

The friction surfaces of the clutch F are maintained in engagement by a spring pack P which provides an initial preload to insure that at least a predetermined minimum resistance to differential action exists.

Each of the clutches F includes a removable insert I which is connected to the casing C for rotation therewith and which forms the friction surface of the clutch F associated with the casing C.

More specifically, and as best seen in FIGURE 1, the differential casing C is integrally formed as by casting, and may be constructed of any suitable material such as, for example, malleable iron.

The casing C includes a pair of spaced apart, generally parallel transverse walls 11, each of which includes a longitudinally elongated hub 13 adapted to receive one of the output shafts S. The shafts are not journalled within the hubs 13, but rather the hubs support bearings (not shown) which position the mechanism within the axle assembly. It is obvious that other arrangements could be provided which would not require hubs and which would not in any way depart from the scope of the invention.

One of the transverse walls 11 is provided with a radially directed flange 14 to which is secured a ring gear (not shown) adapted to receive input torque from the associated drive line system.

The transverse walls are connected by a longitudinally extending, generally cylindrical wall 15 which defines, with the walls 11, an internal cavity 17 surrounding the adjacent ends of the output shafts.

The cylindrical wall 15 is provided with a side port 19 defining a relatively large access opening for assembly of the mechanism as will be explained in greater detail shortly. The side port additionally allows lubricant to enter the cavity for lubrication of both the bevel gear system G and the clutches F.

The interior surface of each of the transverse walls 11 is provided with a generally cylindrical pilot surface or shoulder 21 disposed coaxially of the longitudinal axis of the shafts S and the hubs 13. The side wall 11 extends radially outwardly from the shoulder 21 to form an axial stop surface 22. The shoulder 21 and axial stop surface 22 act to position the insert I within the cavity 17 as will be explained.

A plurality of longitudinally directed end ports 23 in the form of drilled holes are provided in each transverse wall and are spaced about a base circle having a diameter larger than the diameter of the cylindrical shoulder 21, but smaller than the sum of the diameter of the shoulder plus the diameter of the end port hole 23. Thus, the end port holes intersect the shoulder 21 to form a series of inwardly directed notches 25 of generally semi-circular cross-section. (Best seen in FIGURE 2).

Referring now to the bevel gear system G, best seen in FIGURE 1, there is provided an arrangement which transmits output torque to the shafts S and simultaneously allows relative rotation between shafts when necessary, as when a vehicle is cornering.

The bevel gear system includes a pair of side gears 27, each of which is connected to one of the shafts S for rotational movement therewith and axial movement thereon. To effect this relationship between the shafts and side gears, the adjacent ends of the shafts S and the internal bore of the gears are splined as at 28.

The side gears are in constant mesh with a pair of pinion gears 29 supported by a transversely extending pinion pin 31 disposed intermediate the adjacent ends of the shaft S and secured to the casing C for rotation therewith by retainer pin 33.

As can be appreciated, rotation of the differential casing C by the drive line system causes the pinion pin 31 to revolve about the centerline of the shafts S. The pinion gears 29, therefore, transcribe a generally cylindrical path about the axis of the shafts, and as they are in mesh with the side gears 27, the side gears are caused to rotate and thereby transmit torsional effort to the output shafts S.

If one of the output shafts is required to rotate at a different speed from the other, as when cornering, the pinion gears 29 not only revolve about the longitudinal axis of the output shafts, but also rotate about the pinion pin 31 allowing relative movement between the side gears 27. Consequently, the output shafts S rotate relative to each other as well as relative to the casing C.

Differentiation, i.e., relative rotation between the shafts, inherently possible by virtue of the above described structure, is resisted by the engagement of the friction surfaces of the clutches F. Each of these clutches includes a frusto-conical clutch member 35 and one of the cone seat inserts I frictionally engaged by the member 35 along a complementary conical surface.

A spirally progressing groove 37 is provided in the conical surface of the clutch member 35 for distribution of oil or other lubricant to the frictionally engaged surfaces.

Each clutch member 35 includes an internally splined bore 41 connected to one of the shafts S and is, therefore, rotatable with the shaft and axially movable thereon. Each of the clutch members 35 is disposed between one of the transverse walls 11 of the casing C and one of the side gears 27. The respective side gear 27 and the clutch member 35 of each shaft S are in radial contact along the surface 43 and movement of either of these members toward the other, therefore, causes a corresponding movement of the other element in the same direction.

Application of axial force upon the side gears and consequently upon the clutch members 35 is accomplished in two ways; first, initial frictional engagement of the clutch members 35 with the drum or seat surfaces of the inserts I is provided by the spring pack P. The spring pack generally surrounds the transverse pinion pin 31 and includes a pair of gear contacting members 45, each of which is in contact with one of the side gears 27 adjacent the pinion pin. Each of the gear contacting members incluadese axially extending flanges having openings 46 to provide clearance for the pinion pin 31. A plurality of compressed coil springs 47 extend longitudinally between the contacting members 45 and urge them axially outwardly. This axial loading is transmitted to the side gears which are axially movable on the shafts S. The side gears, in turn, transmit the axial force to the clutch members 35, which are also splined to the shafts S and consequently are free to move axially into frictional engagement with the conical friction surfaces on the inserts I.

Secondly, the initial frictional engagement of the clutch member 35 with the insert I, provided by the spring pack P, is increased generally as a function of the torsional input to the mechanism casing C, by the bevel gear system G.

Application of torque to the mechanism creates axial separating forces upon the side gears 27 which forces are, in turn, transferred to the clutch members 35 to provide a cumulative increased frictional engagement of the clutches with the conical inserts I to resist differentiation.

In accordance with the present invention, as best seen in FIGURE 1, the conical drum or seat surfaces frictionally engaged by the clutch members 35 are provided by the removable cone seat inserts I which form the friction surfaces of the clutches F associated with the casing C. These inserts include a generally conically shaped wall portion 53, the interior of which includes a conical seat surface 54 engaged by the clutch member 35. The inserts I may be formed of any suitable material such as, for example, steel, and may be made by any one of several manufacturing processes such as stamping, turning, spinning, grinding, etc.

The convergent end of the conical wall 53 of each insert is provided with an inwardly directed radial flange 55 terminating in a generally cylindrical pilot surface 57 having a diameter approximately equal to the diameter of the pilot shoulder 21, of the casing C. The insert is disposed within the differential casing with the pilot surface 57 overlying the shoulder 21 formed on the casing wall 11 to effect radial location of the insert with respect to the output shafts S and accordingly with respect to the clutch members 35.

Further, the outer surface of the radial flange 55 of each insert is disposed in contact with one of the axial stop surfaces 22 to axially position the inserts I with respect to the casing C and the clutch members 35. These stop surfaces fix the position of the inserts in relation to the clutch members and support them in opposition to the axial forces applied by the spring pack P and side gears upon torque application to effect the frictional engagement between the surfaces 54 and clutch members 35.

As can readily be appreciated, the inserts I must, of necessity, be retained in relatively stationary relationship with respect to the casing C in order to transmit rotational effort from the casing to the clutch member 35 for purposes of resisting differentiation. This is accomplished in the embodiment of FIGURES 1 and 2 by a plurality of radially directed tabs 59 extending inwardly of the pilot diameter 57 which are sized and spaced apart so as to be retained within the drive notches 25 formed by the intersection of the end ports 23 and the shoulder 21. A driving relationship between the inserts I and the casing C is thus established enabling the transmission of rotational effort from the casing C to the clutch members 35 through the frictional engagement of the clutch members 35 with the conical seat surfaces 54.

In the embodiment shown, the pilot surface 57 is relieved slightly adjacent each side of the tabs 59 to define a clearance space between the surface and the shoulder 21. This pilot surface could, of course, be continuous between successive tabs or, in the alternative, the dimensional precision of the relative location and size of the tabs 59 could be controlled to the extent that they would provide radial positioning of the insert as well as driving engagement with the casing C. In such a construction, the pilot surface 57 could be eliminated. Each of these variations, of course, is within the contemplated scope of the invention.

Each insert I is provided with a plurality of lubricating orifices 63 to supply lubricant to the spirally progressing groove 37 of the clutch member 35. These orifices are disposed longitudinally along the insert conical wall 53 in one or more rows as desired. Lubricant within the cavity 17 of the casing C may pass through these orifices into communication with the spiral grooves 37 for distribution to the frictionally engaged surfaces.

In assembling the mechanism, each of the inserts I is first placed in overlying relation to one of the clutch members 35. These components are then inserted through the side port opening 19 and positioned such that the cylindrical pilot surfaces 57 of the inserts properly engage the shoulders 21 of the casing and the outer surfaces of the radial flanges 55 contact the axial stop surfaces 22 with the tabs 59 disposed within the notches 25. The side gears 27 are then placed in contacting relation with the clutch members 35 along the surfaces 43. Alternatively, the side gears and clutch members 35 could be integrally formed.

After the pinion gears are positioned in mesh with the side gears in 180° opposed facing relation, the bevel gear system is rotated to align the pinion gears with respect to the casing C for insertion of the pinion pin 31. The spring pack P is then compressed and installed through the side port with the gear contacting members engaging the side gears. The gear contacting members of the spring pack must be aligned so that the openings 46 are disposed for insertion of the pinion pin. The pin is then inserted through the pinion gears and spring pack and locked to the casing C with the retainer screw 33 to complete the assembly of the device.

It is readily apparent that, in the above-described embodiment, complex machining of the interior wall surface of the casing C has been eliminated. The insert I is positioned and retained by easily formed radial and cylindrical surfaces; namely, the shoulder 21 and the axial stop surface 22. These surfaces may be conveniently formed by conventional machine operations. Driving engagement of the insert I with the casing C, which is essential to proper operation of the mechanism, is provided by engagement of the drive notches 25 with the tabs 59 of the insert. These drive notches are easily formed by the simple drilling operation that forms the end ports 23.

In addition to the simplicity of construction of the device, assembly procedure is uncomplicated and may readily be accomplished. The internal components of the mechanism are installed through the enlarged side port 19 and, therefore, a single piece case may be used. Separate halves secured together for assembly could, of course, be used if desired, but they are not essential.

Other significant advantages of the structure described are also readily apparent. First, it is not necessary to critically control the metallurgical tolerances of the casing C to provide essential wear resistance to integrally formed cone seats. Additionally, the inserts I may be easily formed of any suitable wear-resistant material by any one or a combination of simple manufacturing processes and the insert is resilient enough to overcome minor out-of-round conditions upon application of the spring preload. Also, should damage or excessive wear occur, simple replacement of the inserts re-establishes the mechanism in its initial condition and the assembly may again be used without sacrifice of original operational characteristics.

Referring now to FIGURES 3 and 4, there is shown an embodiment having a modified arrangement for providing a driving engagement between the cone seat inserts an the differential casing as well as an alternate form of lubrication facility for the frictionally engaged contacting surfaces.

In this embodiment, a differential casing $C_2$ is provided which is adapted to transmit rotational effort to a pair of relatively rotatable coaxially aligned output shafts $S_2$ through a bevel gear system $G_2$, which allows differentiation between shafts when necessary. A pair of clutches $F_2$, which provide the desired resistance to differential action, are disposed within the casing in operative association with the output shafts $S_2$. Each of the clutches $F_2$ includes a cone seat insert $I_2$ which forms the friction surface fixed with respect to the casing $C_2$ for transmission of torque to a friction surface associated with one of the shafts $S_2$ to provide resistance to differential action.

The casing $C_2$ is of unitary or single piece construction and includes a pair of parallel spaced apart transverse walls $11a$, each of which includes a hub $13a$ surrounding one of the adjacent ends of the shafts $S_2$. The walls $11a$ are connected by a longitudinally extending generally cylindrical wall $15a$ defining therewith an internal cavity $17a$ surrounding the adjacent ends of the shafts.

Side port 19a is provided which allows entry of lubricant to the cavity 17a and enables the unit to be assembled without the necessity of using separate casing halves.

The interior surfaces of the transverse walls 11a are provided with a generally cylindrical pilot surface or shoulder 21a disposed coaxially of the hubs 13a. Immediately adjacent the shoulders 21a, there is provided a radially directed axial stop surface 22a. The cylindrical pilot surfaces or shoulders 21a and the axial stop surfaces 22a position and locate the cone seat inserts $I_2$ within the casing in a manner as will be explained shortly.

Each transverse wall 11a is further provided with end ports 23a in the form of longitudinally extending drilled holes. In the embodiment shown, two such holes are provided in each wall. These ports intersect a generally annular ring portion 65 formed on each of the transverse walls 11a radially outwardly of the shoulders 21a and separated therefrom by a groove 67. The intersection of the end ports 23a with the ring 65 forms a pair of drive notches 25a in each of the side walls 11a. As the casing $C_2$ may be formed by casting any suitable material, the ring portion 65 and the groove 67 may be initially formed in the casting process. The surfaces 21a and 23a may also be formed simply by any suitable machining operation such as turning, grinding, or drilling.

The bevel gear system $G_2$ includes side gears 27a splined to the shafts $S_2$ and a pair of pinion gears 29a fixed for rotation with the casing $C_2$ by a pinion pin 31a. Transmission of torsional effort to the output shafts $S_2$ is accomplished in a conventional manner through the pinion pin, pinion gears, and side gears, which in addition allow relative rotation between shafts and, consequently, between the shaft and casing C when differential action is required.

Each of the clutch members $F_2$ includes a generally frusto-conical member 35a which is splined to one of the output shafts $S_2$ for rotation with the shaft and axial movement with respect to the shaft. These clutch members are disposed intermediate the side walls 11a and the side gears 27a and are in radial contact with the side gears along surfaces 43a. Each of clutch members 35a includes a spiral groove 37a which progresses along the conical surface for distribution of lubricant to prevent excessive wear during differentiation.

A spring pack $P_2$ is provided which surrounds the pinion pin 31a and provides an axial separating force upon the side gears 27a which is, in turn, transferred to the clutch members 35a to produce the initial frictional engagement of the clutch members with the cone seat inserts $I_2$.

The cone seat inserts include a generally conical wall 53a, the interior of which forms a conical seat surface 54a which is frictionally engaged by the clutch members 35a. The convergent end of each of the inserts $I_2$ is provided with a radially directed flange 55a which terminates in a generally cylindrical pilot surface 57a, which is disposed in overlying relation to the shoulder 21a of side wall 11a to radially position the insert within the casing $C_2$.

Each insert includes a pair of longitudinally extending channels 69 which define on their exterior surfaces drive tabs 59a of generally semi-circular cross-section and on their interior surfaces longitudinally extending lubricant pockets 71 which are open at the conical seat surfaces 54 for communication with the spiral grooves 37a. In the embodiment shown, the channels of each insert are disposed in 180° spaced apart relation.

The externally formed tabs 59a are disposed in the notches 25a formed in the ring portions 65 of the side walls and provide a fixed driving relation between the casing $C_2$ and inserts $I_2$.

The lubricant pockets 71 provide a distribution channel for lubricant within the mechanism to communicate with the spiral grooves 37a of the clutch members for distribution to the frictionally engaged surfaces of the clutches $F_2$. The lubricant pocket 71 includes a longitudinally extending bottom wall 73 which is generally parallel to the longitudinal centerline of the output shafts $S_2$. Thus, lubricant flowing along the pocket 71 may move in a path generally parallel to the output shafts.

With the arrangement shown in FIGURES 3 and 4, as with the previously described embodiment, simply constructed removable inserts are provided which form the clutch cone seat surfaces associated with the differential casing for engagement by the clutch members. The mechanism may be assembled in a manner similar to the assembly of the previously described embodiment and will provide similar advantages in construction, operation, assembly, and repair. In addition, this embodiment incorporates drive means which require only a minimal amount of machining of the differential casing and a slight modification of the inserts which, in addition to providing a drive connection, serves to distribute lubricant efficiently to the frictionally engaged clutches.

Turning now to the embodiment of FIGURES 5 and 6, a modified form of biasing means to provide initial preload upon the differentiation resisting clutch members is shown.

In this embodiment, referring particularly to FIGURE 5, a casing $C_3$ is disposed in surrounding relation to the adjacent ends of a pair of coaxially aligned output shafts $S_3$. A bevel gear system, generally designated $G_3$ is operatively associated with the casing and shafts and provides a driving relation therebetween and allows relative movement between shafts when necessary. Conical clutch members $F_3$ are disposed within the casing to provide resistance to differential action. These clutches include cone seat inserts $I_3$ which define the conical surfaces associated with the casing and establish a frictional driving relation between the casing and shafts through the clutches $F_3$.

In this embodiment, the casing $C_3$ and the inserts $I_3$ are similar in form to the casing and inserts of the embodiment of FIGURES 1 and 2. The casing includes a shoulder 21b and an axial stop surface 22b and a plurality of drive notches 25b for positioning and driving each of the inserts $I_3$. Each of the inserts includes a generally radially directed flange 55b at its convergent end which is provided with a pilot surface 57b which overlies the shoulder 21b of the casing and a plurality of radially directed tabs 59b which engage the notches 25b to establish the driving relationship. The outer surfaces of the radial flanges 55b abut the axial stop surfaces 22b to establish the axial position of the inserts within the casing $C_3$.

Side gears 27b and clutch members 35b are provided which are generally similar in function to the clutch members and side gears of the embodiment of FIGURES 1 and 2. However, a plurality of spring pockets 75 are provided in each of these members in its respective adjacent radially contacting side wall (FIGURE 5). A plurality of compressed coil springs 47b are disposed within these pockets and operate to urge the clutch members into frictional driving engagement with the cone seat inserts. As the side gears are splined to the output shafts S, the action of the coil springs would cause the gears to move inwardly rather than to effect frictional engagement of the clutch members with the inserts. Therefore, a thrust block 77 is provided intermediate the side gears to retain them in a predetermined spaced apart relation. Thus, the spring force is effective to frictionally engage the clutch members and the inserts $I_3$.

In the embodiment of FIGURE 6, the pockets 75 are replaced by facing annular grooves 79 within which are disposed Belleville type spring washers 81 which effectively provide the initial preload of the clutch members. In this arrangement, as in the arrangement shown in FIGURE 5, a thrust block 77 is provided to resist inward movement of the side gears causing the axial separating force provided by the springs between the side gears and the clutch members to effectively provide frictional engagement of the clutch members with the cone seat inserts.

Turning now to the embodiment of FIGURE 7, a modified arrangement for positioning and driving the cone seat inserts is shown. A differential casing $C_4$ is provided which includes a pair of spaced apart transverse side walls $11c$ (one of which is shown) which support longitudinally extending hubs $13c$ in surrounding relation to output shafts $S_4$. The interior surface of the wall $11c$ includes a generally radially directed surface 83 which extends to the inner diameter of the hubs $13c$.

The internal diameters of the hubs are provided with a series of serrations 85, although as will be appreciated, any suitable interlocking configuration could satisfactorily be used.

A pair of cone seat inserts $I_4$ (one shown) are disposed within the casing $C_4$. Each insert includes a conical wall $53c$ which defines a conical friction surface for engagement by clutch member $35c$. The convergent end of each insert includes a radially directed flange $55c$ which terminates at its inner diameter in a tubular portion 87 which extends longitudinally outwardly in a direction away from the conical wall $53c$.

The external surface of the tubular portion 87 is provided with mating serrations which engage the serrations 85 of the hubs $13c$ to provide driving engagement between the casing $C_4$ and the inserts $I_4$. Further, the tubular portion is positioned within the hub in a manner so as to radially position the insert with respect to the casing $C_4$ and the shafts $S_4$.

The radially directed flange $55c$ of the cone seat inserts $I_4$ abuts against the radially directed surface 83 of the transverse walls $11c$ to define the axial position of the cone seat inserts within the casing $C_4$ and to provide the necessary reaction force against the axial movement of the clutch members into frictional engagement with the inserts.

It is, of course, obvious that any form of interlocking arrangement could be used to connect the tube portion 87 of the inserts to the hubs $13c$ of the casing. In fact, it would be within the contemplated scope of the invention to provide a bonded connection between these elements as by brazing or welding which would eliminate the need for more complicated configurations which would interlock. The interlocking arrangement, however, would simplify the assembly and disassembly procedures associated with production of a differential mechanism utilizing the arrangement shown in FIGURE 7.

The remaining components of the structure, such as the bevel gear system $G_4$ and spring pack $P_4$ may be conveniently constructed in accordance with the disclosure of FIGURES 1 and 2.

Referring now to FIGURE 8, an alternative arrangement for securing a cone seat insert to a differential casing is shown.

In this arrangement, a differential casing $C_5$ is provided which includes a pair of transverse spaced apart parallel walls $11d$ (one of which is shown). The interior surface of the transverse walls includes a cylindrical pilot surface $21d$ and a radially directed axial stop surface $22d$. A plurality of end ports $23d$ extend through the walls $11d$ and are disposed about the wall upon a base circle diameter substantially equal to the diameter of the shoulder $21d$ plus the diameter of the end port opening. A pair of cone seat inserts $I_5$ (only one of which is shown) are disposed within the casing C and are frictionally engaged by clutch members $35d$. Each insert includes a radial flange $55d$ terminating in a cylindrical pilot surface $57d$ overlying the shoulder $21d$ of the side wall $11d$, to radially position the insert within the casing. The exterior surface of the radial flange $55d$ is disposed in contact with the axial stop surface to axially position the insert within the casing.

The end port openings provided in the transverse walls $11d$ are filled with weld material generally designated 89 which bonds the inserts $I_5$ to the side walls. As a plurality of end ports are provided, all or a portion of the end ports may be utilized for this purpose as desired to provide an adequate connection between the inserts and the casing to transmit rotational effort to the output shafts through the frictionally engaged members.

As can be seen, a new and novel arrangement has been provided for a differential mechanism utilizing conically shaped clutch members to resist differential action. While various specific embodiments have been described in detail, it is readily apparent that a variety of arrangements could be used and it should be obvious to one skilled in the art that various modifications of the concept shown could be made without in any way departing from the spirit and scope of the invention.

I claim:

1. An insert for a limited slip differential mechanism comprising means defining a generally conical seat surface for engagement by a conical clutch member; means adjacent the convergent end of said conical surface defining a generally cylindrical pilot surface to radially position said insert; said last mentioned means further including a generally radially directed surface laterally adjacent said cylindrical pilot surface to axially position said insert.

2. An insert for a limited slip differential mechanism comprising a generally conical wall defining a conical seat surface for engagement by a conical clutch member; a radially directed flange adjacent the convergent end of said conical seat surface, having a generally cylindrical pilot surface to radially position said insert, a generally radially directed surface laterally adjacent said pilot surface to axially position said insert, and at least one drive tab extending radially inwardly of said cylindrical pilot surface to be disposed in driving engagement.

3. An insert for a limited slip differential mechanism comprising a generally conical wall defining a conical seat surface for engagement by a conical clutch member; a radially directed flange adjacent the convergent end of said conical seat surface, said flange including a plurality of radially inwardly directed drive notches disposed in circumferentially spaced apart relation to define means for radially positioning said insert and for providing driving engagement.

4. An insert for a limited slip differential mechanism comprising means defining a generally conical seat surface for engagement by a conical clutch member; means adjacent the convergent end of said conical surface defining a generally cylindrical pilot surface to radially position said insert; means extending radially outwardly of said conical seat surface defining at least one channel extending laterally across said conical surface, said channel defining a drive tab.

5. An insert for a limited slip differential mechanism comprising means defining a generally conical seat surface for engagement by a conical clutch member; means adjacent the convergent end of said conical surface defining a generally cylindrical pilot surface to radially position said insert; means extending radially outwardly of said conical seat surface defining at least one channel extending laterally across said conical surface, said channel defining a drive tab, said channel further defining a lubricant groove open at said conical surface and including a wall disposed opposite said opening at said surface extending longitudinally in a direction generally parallel to the axis of said conical seat surface.

6. An insert for a limited slip differential mechanism comprising a generally conical wall defining a generally conical seat surface for engagement by a conical clutch member; a generally radially directed flange adjacent the convergent end of said conical seat member extending radially inwardly therefrom and terminating in a generally tubular portion extending axially in a direction away from said conical seat surface, said radially directed flange including a radial surface to axially position said insert and said tubular portion radially positioning said insert.

7. An insert for a limited slip differential mechanism comprising a generally conical wall defining a generally conical seat surface for engagement by a conical clutch member; a generally radially directed flange adjacent the convergent end of said conical seat member extending radially inwardly therefrom and terminating in a generally tubular portion extending axially in a direction away from said conical seat surface, said radially directed flange including a radial surface to axially position said insert and said tubular portion radially positioning said insert, said tubular portion further including at least one externally formed serration to provide a driving engagement.

References Cited

UNITED STATES PATENTS

| 1,141,648 | 6/1915 | Mitchella | 192—107 X |
| 2,395,189 | 2/1946 | Lapsley et al. | 192—107 |
| 2,965,205 | 12/1960 | Winchell | 192—66 |

FOREIGN PATENTS

| 736,595 | 6/1943 | Germany. |
| 954,721 | 4/1964 | Great Britain. |

FRED C. MATTERN, Jr., *Primary Examiner.*

ARTHUR T. McKEON, *Assistant Examiner.*